US012781808B2

(12) United States Patent
Davis et al.

(10) Patent No.: US 12,781,808 B2
(45) Date of Patent: Nov. 3, 2026

(54) SUBSEA TORQUE LIMITER

(71) Applicant: FMC Technologies, Inc., Houston, TX (US)

(72) Inventors: Vigil Davis, Secundarabad (IN); Neelesh Chandola, Nainital (IN); Teja Adiraju, Hyderabad (IN)

( * ) Notice: Subject to any disclaimer, the term of this patent is extended or adjusted under 35 U.S.C. 154(b) by 270 days.

(21) Appl. No.: 18/683,756

(22) PCT Filed: Aug. 27, 2021

(86) PCT No.: PCT/US2021/048080

§ 371 (c)(1),
(2) Date: Feb. 14, 2024

(87) PCT Pub. No.: WO2023/027736

PCT Pub. Date: Mar. 2, 2023

(65) Prior Publication Data

US 2024/0369109 A1 Nov. 7, 2024

(51) Int. Cl.
*F16D 7/08* (2006.01)
*F16D 43/206* (2006.01)

(52) U.S. Cl.
CPC ............. *F16D 7/08* (2013.01); *F16D 43/206* (2013.01)

(58) Field of Classification Search
CPC ................................. F16D 7/08; F16D 43/206
USPC ........................................................... 464/36
See application file for complete search history.

(56) References Cited

U.S. PATENT DOCUMENTS

| | | | | | |
|---|---|---|---|---|---|
| 3,252,303 | A | | 5/1966 | Weasler et al. | |
| 3,292,754 | A | | 12/1966 | Peterson | |
| 3,942,337 | A | * | 3/1976 | Leonard | F16D 7/08 464/36 |
| 4,463,930 | A | * | 8/1984 | Vamvakas | F16K 31/048 464/36 |
| 5,646,355 | A | | 7/1997 | Fukushima et al. | |
| 5,700,196 | A | * | 12/1997 | Banemann | F16D 7/08 464/36 |
| 8,403,054 | B2 | | 3/2013 | Udipi et al. | |
| 2017/0114612 | A1 | | 4/2017 | Lewkoski | |

* cited by examiner

*Primary Examiner* — Greg Binda
(74) *Attorney, Agent, or Firm* — Henry C. Query, Jr.

(57) ABSTRACT

A torque limiter includes a housing; an input shaft which is rotatably supported in the housing; an output shaft which is rotatably supported in the housing coaxially with the input shaft; and a ball detent mechanism which is connected between adjacent ends of the input and output shafts. The ball detent mechanism includes a ball ring and has a plurality of ball members; a detent ring which is connected to the input shaft and has a plurality of detents which are configured to receive the ball members; and a biasing member which is positioned on a side of the ball ring opposite the detent ring. The biasing member is operatively engaged with the ball members so as to bias the ball members in a direction toward the detent ring and is designed to generate a force sufficient to maintain the ball members seated in the detents when a torque less than a predetermined torque is applied to the input shaft.

24 Claims, 5 Drawing Sheets

SUBSEA TORQUE LIMITER

The present disclosure is directed to a torque limiter for limiting the amount of torque which can be transmitted from a torque input device, such as an ROV end effector, to a torque-driven device, such as a subsea valve.

BACKGROUND OF THE DISCLOSURE

Torque limiters are commonly used to protect torque-driven devices from torque-generating (or torque input) devices. In the subsea oil and gas industry, for example, subsea valves are often actuated by remotely operated vehicles (ROV's), and torque limiters are used to protect the valves from over torque applied by the ROV torque tool. As an example, ROV class IV torque tools are capable of applying up to 2000 ft-lbs of torque. However, the valve stems of smaller valves have low torque capacity and are therefore prone to fail due to over torque from the ROV torque tool. Moreover, the output from ROV torque tools is often difficult to precisely control in subsea environments.

Some prior art torque limiters use shear pins to protect the valve stems from failing. The shear pins are connected between input and output shafts of the torque limiters and are designed to fail when the torque applied to the input shaft reaches a predetermined level. However, shear pins sometimes fail inadvertently due to their inherent properties. Moreover, retrieving the torque limiter in order to replace the shear pins leads to downtime in the subsea operation, which can be expensive due to the high costs to operate the ROV and its associated vessel.

SUMMARY OF THE DISCLOSURE

In accordance with the present disclosure a subsea torque limiter is provided which comprises an input shaft, an output shaft and a ball detent mechanism which is operatively connected between the input shaft and the output shaft. The ball detent mechanism comprises a detent ring connected to one of the input shaft and the output shaft and a ball ring connected to the other of the input shaft and the output shaft. The detent ring comprises a plurality of detents, and the ball ring comprises a plurality of ball members which are each configured to be received in the detents. In an engaged condition of the ball detent mechanism, the ball members are maintained in position in the detents, thereby rotatably coupling the input shaft to the output shaft, and in a disengaged condition of the ball detent mechanism, the ball members are displaceable from the detents, thereby rotatably decoupling the input shaft from the output shaft.

The ball detent mechanism further comprises a biasing member positioned on a side of the ball ring opposite the detent ring or on a side of the detent ring opposite the ball ring. The biasing member is designed to generate a force sufficient to maintain the ball detent mechanism in the engaged condition when a torque less than a predetermined torque is applied to the input shaft. In this manner, when the torque applied to the input shaft reaches the predetermine torque, the ball detent mechanism will switch to the disengaged condition and rotatably decouple the input shaft from the output shaft.

In accordance with one embodiment of the disclosure, the ball members are discrete components and the ball ring comprises a plurality of through holes within which the ball members are movably received.

In accordance with another embodiment of the disclosure, the biasing member is positioned on a side of the ball ring opposite the detent ring and is operatively engaged with the ball members so as to bias the ball members in a direction toward the detent ring.

In accordance with yet another embodiment of the disclosure, the torque limiter further comprises a thrust ring which is positioned between the biasing member and the ball members.

In accordance with a further embodiment of the disclosure, the biasing member is positioned between the ball members and an annular shoulder formed in a housing within which said other of the input shaft and the output shaft is rotatably received.

In accordance with another embodiment of the disclosure, the biasing member is positioned between the ball members and a seat ring which is connected to said other of the input shaft and the output shaft.

In accordance with yet another embodiment of the disclosure, the detent ring is axially movably but rotationally immovably connected to said one of the input shaft and the output shaft, the biasing member is positioned on a side of the detent ring opposite the ball ring, and the biasing member is operatively engaged with the detent ring so as to bias the detent ring toward the ball members.

In accordance with a still another embodiment of the disclosure, the biasing member is positioned between the detent ring and a reaction ring which is connected to said one of the input shaft and the output shaft.

In accordance with a further embodiment of the disclosure, the ball members are fixedly connected to or formed integrally with the ball ring.

In accordance with another embodiment of the disclosure, the ball ring is axially movably but rotationally immovably connected to said other of the input shaft and the output shaft, the biasing member is positioned on a side of the ball ring opposite the detent ring, and the biasing member is operatively engaged with the ball ring so as to bias the ball ring toward the detent ring.

In accordance with yet another embodiment of the disclosure, the detent ring is axially movably but rotationally immovably connected to said one of the input shaft and the output shaft, the biasing member is positioned on a side of the detent ring opposite the ball ring, and the biasing member is operatively engaged with the detent ring so as to bias the detent ring toward the ball members.

In accordance with still another embodiment of the disclosure, the biasing member is positioned between the detent ring and a reaction ring which is connected to said one of the input shaft and the output shaft.

In accordance with a further embodiment of the disclosure, the torque limiter includes means for pressure compensating the ball detent mechanism. In one embodiment, the pressure compensating means comprises a pressure chamber which is separated from an environment external to the torque limiter by a flexible member; a first channel which extends between the pressure chamber and a first side of the ball detent mechanism; and a second channel which extends between the pressure chamber and a second side of the ball detent mechanism.

In accordance with another aspect of the disclosure, a torque limiter is provided which comprises a housing; an input shaft which is rotatably supported in the housing; an output shaft which is rotatably supported in the housing coaxially with the input shaft; and a ball detent mechanism which is connected between adjacent ends of the input and output shafts. The ball detent mechanism includes a ball ring connected to the output shaft and a detent ring connected to the input shaft. The ball ring comprises a plurality of axial through holes and a corresponding number of ball members which are movably received in the through holes, and the detent ring comprises a plurality of detents which are configured to receive the ball members.

In this embodiment, ball detent mechanism also includes a biasing member positioned on a side of the ball ring opposite the detent ring. The biasing member is operatively engaged with the ball members so as to bias the ball members in a direction toward the detent ring and is designed to generate a force sufficient to maintain the ball members seated in the detents when a torque less than a predetermined torque is applied to the input shaft. In an engaged condition of the ball detent mechanism, the ball members are maintained in position in the detents, thereby rotatably coupling the input shaft to the output shaft, and in a disengaged condition of the ball detent mechanism, the ball members are displaceable from the detents, thereby rotatably decoupling the input shaft from the output shaft. In this manner, when the torque applied to the input shaft reaches the predetermine torque, the ball detent mechanism will switch to the disengaged condition and rotatably decouple the input shaft from the output shaft.

In accordance with one embodiment of the disclosure, the biasing member is positioned between the ball members and an annular shoulder formed in the housing.

In accordance with another embodiment of the disclosure, the torque limiter also comprises a thrust ring which is positioned between the biasing member and the ball members.

In accordance with yet another embodiment of the disclosure, the torque limiter further comprises means for pressure compensating the ball detent mechanism.

In accordance with a further embodiment of the disclosure, the pressure compensating means comprises a pressure chamber which is formed in the housing and is separated from an environment external to the torque limiter by a flexible member; a first channel which extends through the housing between the pressure chamber and a first side of the ball detent mechanism; and a second channel which extends through the housing between the pressure chamber and a second side of the ball detent mechanism.

In accordance with one embodiment of the disclosure, the housing is configured to be mounted to a valve operator or fitted in an ROV bucket.

Thus, it may be seen that the torque limiter of the present disclosure offers several advantages. For example, the torque limiter is bi-directional, that is, it can operate to disengage the drive shaft from the driven shaft regardless of the direction which the input shaft is rotating. As a result, the same torque limiter can be used for multiple operations. Also, the torque limiter is designed to automatically reset itself after an over torque event once the input torque drops below the predetermined value. Therefore, the operation of the torque input and torque-driven devices does not have to be interrupted after an over torque event. Further, the input and output shafts remain axially immobile during the transition between the engaged and disengaged conditions. As a result, the connections between the torque limiter and the torque input and torque-driven devices do not need to be specially configured to accommodate axial movement of the input and output shafts.

These and other objects and advantages of the present disclosure will be made apparent from the following detailed description, with reference to the accompanying drawings. In the drawings, the same reference numbers may be used to denote similar components in the various embodiments.

DETAILED DESCRIPTION

Figure 1:
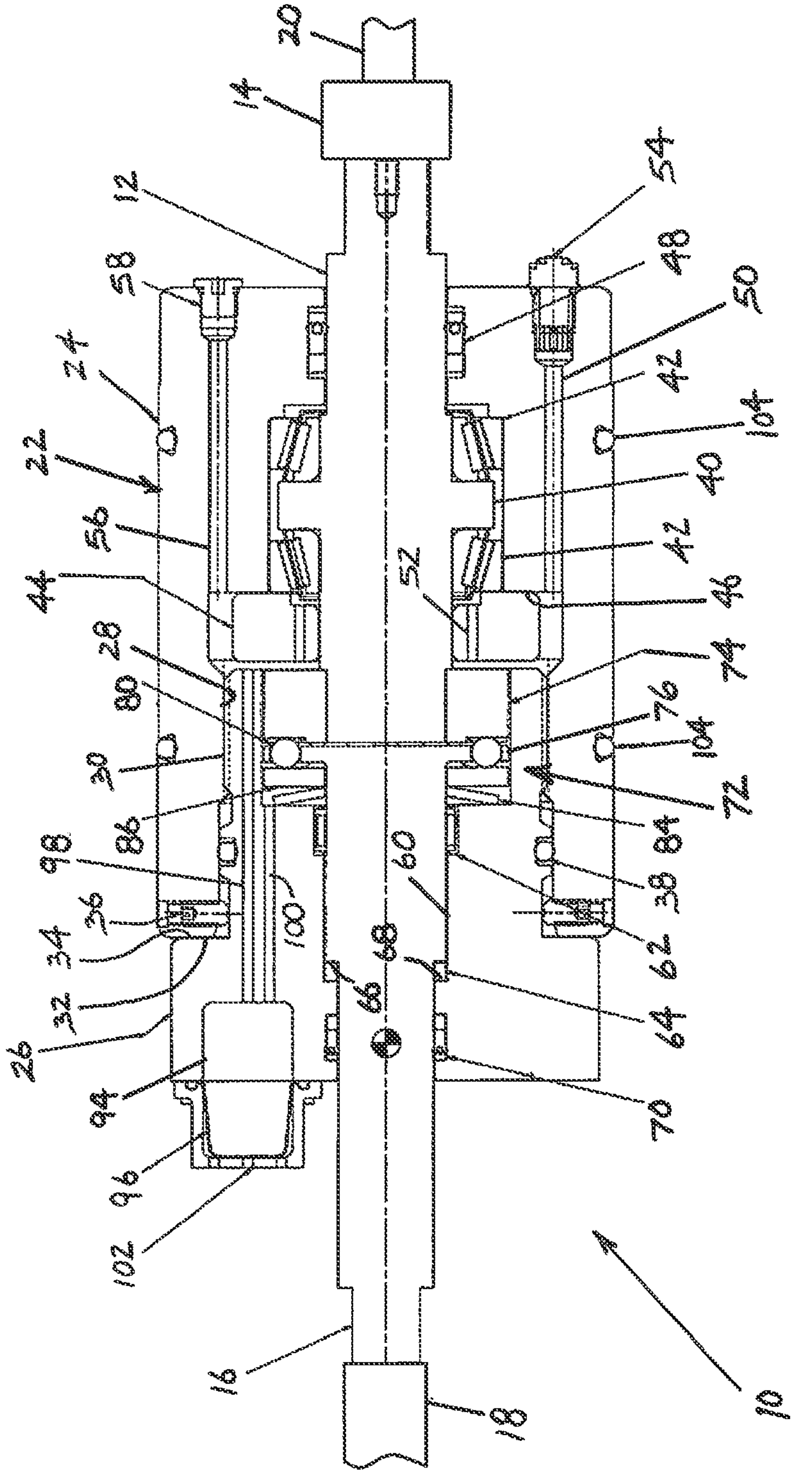
FIG. 1 is a cross sectional view of one embodiment of the torque limiter of the present disclosure.
Figure 2:
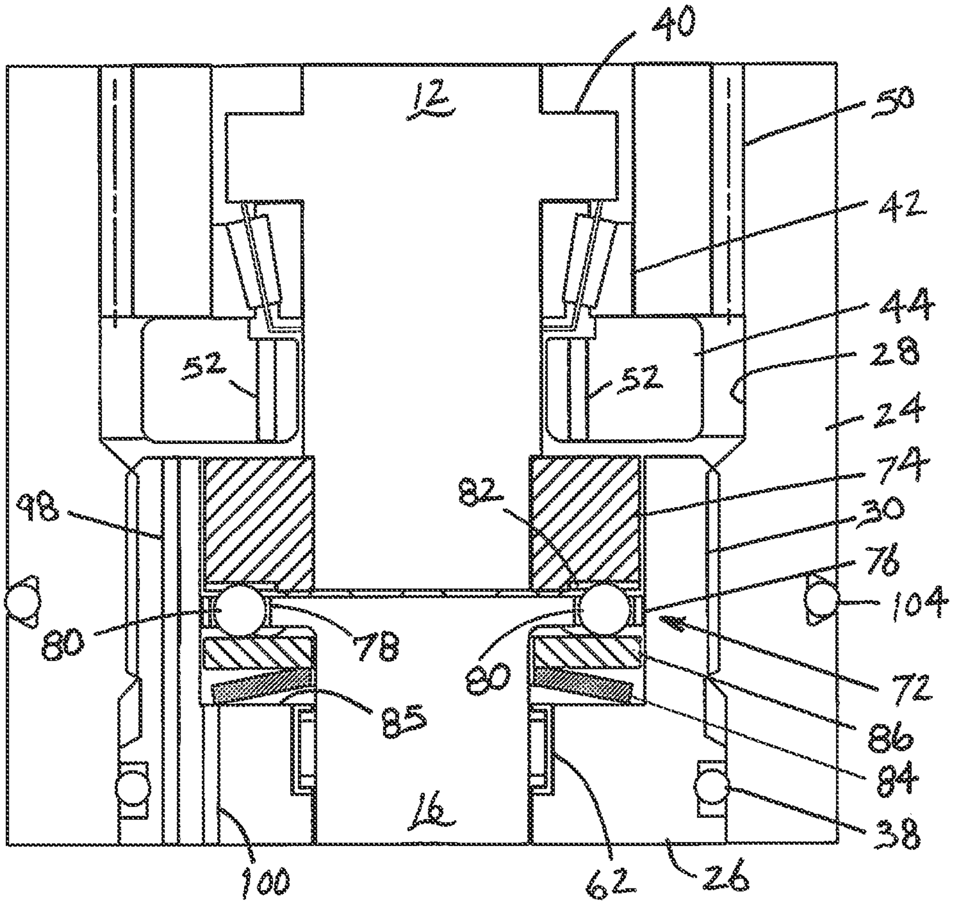
FIG. 2 is an enlarged cross sectional view showing the ball detent mechanism of the torque limiter of FIG. 1.

The present disclosure is directed to a torque limiter for limiting the amount of torque which can be transmitted from a torque input device to a torque-driven device. In the context of the present disclosure, a torque input device can be any device which is designed to impart a rotational force to a mechanical component. Examples of torque input devices may include drive shafts, gears, torque tools and robot end effectors. Also, a torque-driven device can be any component which is designed to be rotated by a torque input device, such as, for example, a valve stem, a driven shaft, a gear, a leadscrew, a rotary switch or a screw-type fastener. In the specific example of a subsea hydrocarbon production system, a torque input device may be an ROV manipulator arm or end effector and a torque-driven device may be a valve actuator or valve stem of a subsea Christmas tree or subsea manifold. It should be understood, however, that the present disclosure has application beyond these few examples.

In accordance with one embodiment of the disclosure, the torque limiter includes an input shaft which is connectable to a torque input device, and output shaft which is connectable to a torque-driven device, and a ball detent mechanism which is operatively connected between the input shaft and the output shaft. In this embodiment, the ball detent mechanism comprises a detent ring which is connected to one of the input shaft and the output shaft and a ball ring which is connected to the other of the input shaft and the output shaft. The detent ring includes a plurality of detents, and the ball ring includes a plurality of ball members which are each configured to be received in the detents. In an engaged condition of the ball detent mechanism, each ball member is maintained in position in a corresponding detent, thereby rotatably coupling the input shaft to the output shaft. In a disengaged condition of the ball detent mechanism, the ball members are displaceable from the detents, thereby rotatably decoupling the input shaft from the output shaft.

The ball detent mechanism of this embodiment further includes a biasing member which is positioned on a side of the ball ring opposite the detent ring or on a side of the detent ring opposite the ball ring. The biasing member is designed to generate a force sufficient to maintain the ball detent mechanism in the engaged condition when a torque less than a predetermined torque is applied to the input shaft. Thus, when the torque applied to the input shaft reaches the predetermined torque, the ball detent mechanism will switch to the disengaged condition and rotatably decouple the input shaft from the output shaft.

In this manner, the torque limiter of the present disclosure functions to limit the amount of torque which can be transmitted from the torque input device to the torque-driven device to the predetermined torque. The predetermined torque can be selected, e.g., based on the torsional strength of the torque-driven device. Also, the biasing member is designed to generate a force sufficient to maintain the ball detent mechanism in the engaged condition until the predetermined torque is reached, at which point the ball detent mechanism will disengage the drive shaft from the driven shaft and, thus, the torque input device from the torque-driven device.

Thus, prior to reaching the predetermined torque, the torque limiter will rotationally couple the torque input device to the torque-driven device so as to enable the torque input device to operate the torque-driven device as required for a particular application. However, when the torque applied by the torque input device reaches the predetermined torque, the torque limiter will decouple the torque input device from the torque-driven device, thereby protecting the torque-driven device from damage.

In accordance with one embodiment of the invention, the torque limiter is designed such that, when the torque applied by the torque input device falls below the predetermined torque, the biasing member will automatically reengage the ball detent mechanism to thereby rotationally reconnect the torque input device to the torque-driven device. In certain aspects the torque limiter may be designed such that the ball detent mechanism is reengaged without the need to re-set the torque limiter, such as, e.g., by reversing the direction of rotation of the torque input device or mechanically reengaging the ball detent mechanism. As a result, the operation of the torque-driven device can be seamlessly resumed by simply reducing the amount of torque generated by the torque input device.

An exemplary embodiment of the torque limiter of the present disclosure will be described in connection with FIG. 1. The torque limiter of this disclosure, which is indicated generally by reference number 10, includes an input shaft 12 which is connectable to a torque input device 14, and an output shaft 16 which is connectable to a torque-driven device 18. In this example, the torque input device 14 may be an end effector of an ROV manipulator arm 20, and the torque-driven device 18 may be the valve stem of a valve of a subsea Christmas tree or manifold. For purposes of simplicity, only a portion of the ROV manipulator arm 20 and the valve stem are shown. However, the design and operation of these components are well known to those skilled in the art.

The input and out shafts 12, 16 are rotationally supported in a housing 22. The housing 22 may be a unitary component or, as shown in FIG. 1, an assembly of two or more housing parts, including an input housing part 24 and an output housing part 26 which are secured together by suitable means. More specifically, the input housing part 24 may comprise a cylindrical receptacle 28 and the output housing part 26 may comprise a cylindrical sleeve portion 30 which is threadedly received in the receptacle. In this example, the housing 22 may be designed such that an axial end 32 of the input housing part 24 engages an outer shoulder 34 on the output housing part 26 when the input and output housing parts are assembled. If desired, the input and output housing parts 24, 26 may be secured together by a number of optional set screws 36, and one or more annular seals 38, such as 0-rings, may be provided to seal the inner housing part to the outer housing part and thereby prevent external fluid, such as seawater, from entering the interior of the housing 22.

In the exemplary embodiment of the disclosure shown in FIG. 1, the input shaft 12 includes a radial flange 40 which is positioned between a pair of suitable bearings 42, such as tapered roller bearings, to thereby rotationally support the input shaft in the housing 22. In this example, the assembly of the flange 40 and the bearings 42 is received in the receptacle 28 and secured therein by a retainer ring 44, which may be attached to the input housing part 24 by suitable means. For example, the retainer ring 44 may be attached by screws or similar connectors (not shown) to an annular ledge 46 formed in the input housing part 24. In one aspect of the disclosure, the input shaft 12 is sealed to the input housing part 24 by a suitable shaft seal 48.

The toque limiter 10 may include optional means for lubricating the bearings 42 and/or the ball detent mechanism 72. As shown in FIG. 1, for instance, the input housing part 24 may be provided with a lubricant supply port 50 connected to a portion of the receptacle 28 which in turn communicates with the bearings 42 (via one or more through bores 52 in the retainer ring 44) and the ball detent mechanism 72. An oil based lubricant may be injected into the supply port 48 through an injection fitting 54, and the input housing 24 may be provided with a lubricant return port 56 which is closed by a relief fitting 58 that is activated when the pressure of the lubricant reaches a predetermined limit.

In the exemplary embodiment of the disclosure shown in FIG. 1, the output shaft 16 is rotationally supported in a corresponding bore 60 in the output housing part 26 by suitable bearing means, such as a cylindrical bearing 62 and a thrust bearing 64, the latter of which is positioned between an annular shoulder 66 on the output shaft and a radial flange 68 formed in the bore. In addition, the output shaft 16 may be sealed to the output housing part 26 by a suitable shaft seal 70.

Disposed between the input shaft 12 and the output shaft 14 is a ball detent mechanism 72 In this illustrative example, in which the input and output shafts 12, 16 are positioned coaxially end to end, the ball detent mechanism 72 is positioned axially between the adjacent ends of the input and output shafts. The ball detent mechanism 72 of this embodiment includes a detent ring 74 which is connected to the input shaft 12 and a ball ring 76 which is connected to the output shaft 16. The ball ring 76 may be formed integrally with the output shaft 16 or comprise a separate component which is fixedly connected to the output shaft. The ball ring 76 includes a plurality of through holes 78 within which a corresponding number of ball members 80 are movably received. The ball members 80 comprise a diameter greater than the axial length of the through holes 78. Accordingly, in an engaged condition of the ball detent mechanism 72, the ball members 80 extend axially beyond the ball ring 76 and are received in corresponding detents 82 in the detent ring 74.

The ball detent mechanism 72 also includes a biasing member 84 positioned on a side of the ball ring 76 opposite the detent ring 74. The biasing member 84 is designed to bias the ball members 80 into the detents 82 with sufficient force to maintain the ball detent mechanism 72 in the engaged condition when the torque on the input shaft 12 is less than a predetermined value, as will be described more fully below. The biasing member 84 may be, e.g., a mechanical spring member, such as a Belleville washer, which in one example may be supported on a radial shoulder 85 located in the second housing part 26. Also, in order to facilitate the engagement between the biasing member 84 and the ball members 80, a thrust ring may be disposed between the biasing member and the ball members. In this manner, the force generated by the biasing member 84 will be transmitted to the ball members 80 by the thrust ring 86.

Figure 3:
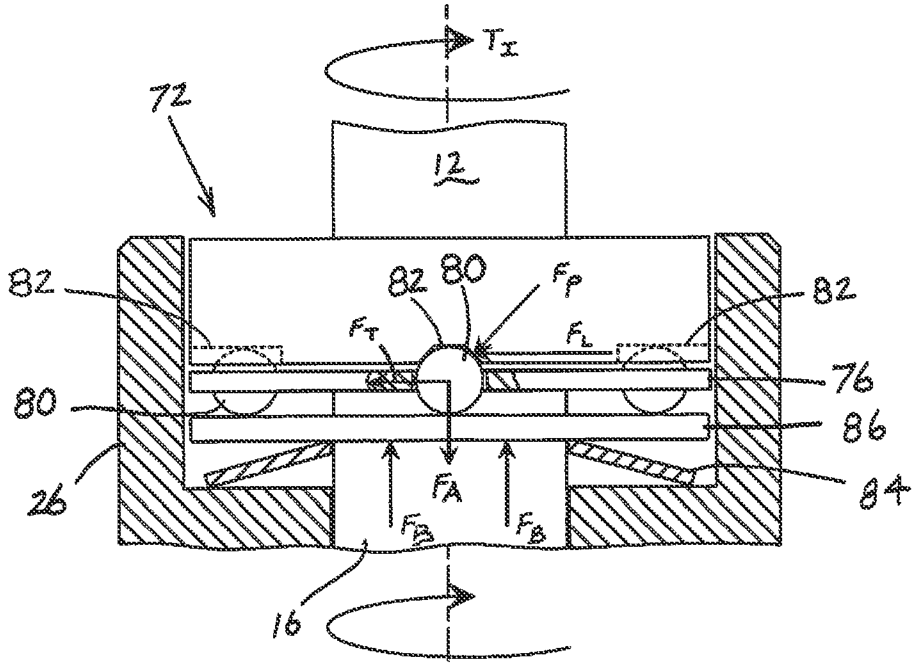
FIG. 3 is an enlarged cross sectional representation of the ball detent mechanism of FIG. 2 shown in the engaged condition.
Figure 4:
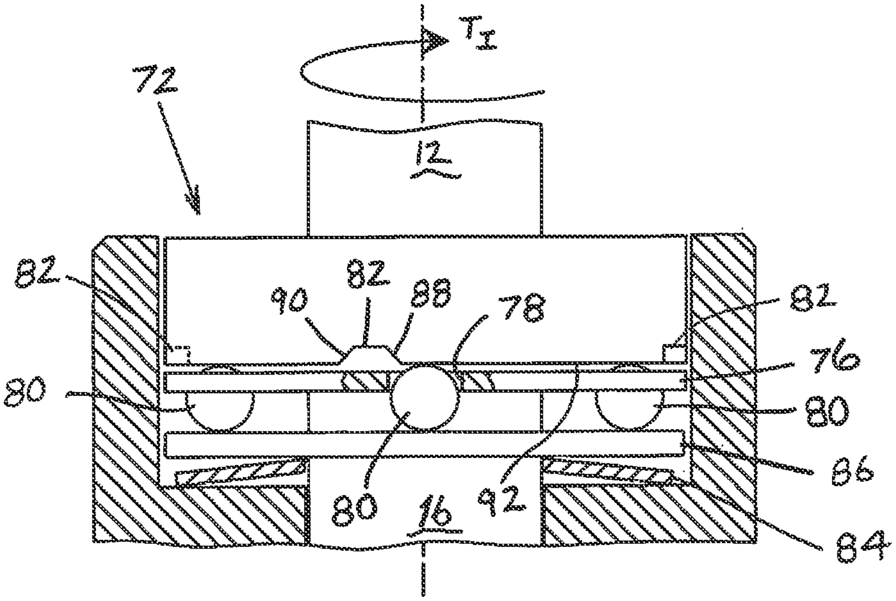
FIG. 4 is an enlarged cross sectional representation of the ball detent mechanism of FIG. 2 shown in the disengaged condition.

The operation of the ball detent mechanism 72 will be described with reference to FIGS. 3 and 4. As shown most clearly in FIG. 4, each detent 82 includes opposite first and second sides 88, 90 which extend axially from a bottom surface 92 of the detent ring 74. The sides 88, 90 are inclined at opposite angles and are spaced sufficiently apart to receive the ball members 80 therebetween (as shown in FIG. 3). The angle of incline, the axial depth of the detents 82 and the diameter of the ball members 80 are selected so that a known relationship exists between the torque operating on the input shaft 12 and the resultant axial force acting on the ball members.

More specifically, as shown in FIG. 3, an input torque $T_I$ acting on the input shaft 12 creates a linear force $F_L$ at each detent 82 which is oriented perpendicular to the axis of the input shaft. This linear force $F_L$ includes a component $F_P$ which is oriented perpendicular to the side 88. This force component $F_P$ is transmitted to the ball member 80 and is resolved into a transverse component $F_T$ and an axial component $F_A$. The sum of the axial components $F_A$ transmitted through all the ball members 80, which will be referred to as the total axial force $F_{AT}$, is counteracted by the biasing force $F_B$ from the biasing member 84. As long as the input torque $T_I$ on the input shaft 12 is less than a predetermined torque, the biasing force $F_B$ will be greater than the total axial force $F_{AT}$ and the ball members 80 will remain seated in the detents 82. In this condition, which is the engaged condition of the ball detent mechanism 72 shown in FIG. 3, the input shaft 12 is rotationally coupled to the output shaft 16.

However, if the input torque $T_I$ reaches or exceeds the predetermined torque, the total axial force $F_{AT}$ transmitted through the ball members 80 will be greater than the biasing force $F_B$. As a result, the ball members 80 will be forced up the sides 88 of the detents 82 and compress the biasing member 84. Continued rotation of the detent ring 74 will then position the ball members 80 against the bottom surface 92 of the detent ring 74. In this condition, which is the disengaged condition of the ball detent mechanism 72 shown in FIG. 4, the detent ring 74 is free to rotate relative to the ball ring 76. Although continued rotation of the detent ring 74 will position the ball members 80 opposite the next successive detents 82, the angular momentum of the detent ring will prevent the ball members from seating in the detents and thereby coupling the input shaft 12 to the output shaft 16, as long as the input torque $T_I$ remains at or above the predetermined torque. Thus, in the disengaged condition of the ball detent mechanism 72, the input shaft 12 will remain rotationally decoupled from the output shaft 16.

An advantage of the torque limiter 10 just described is the bi-directional nature of the ball detent mechanism 72. As shown in FIGS. 3 and 4, since the opposite sides 88, 90 of the detents 82 are both inclined, the total axial force $F_{AT}$ transmitted through the ball members 80 will be approximately the same regardless of the direction of rotation of the input shaft 12. Of course, in certain embodiments the ball detent mechanism 72 may be designed to be unidirectional by configuring the ball members 80 and the detents 82 accordingly.

A further advantage of the torque limiter 10 is the ability of the ball detent mechanism 72 to automatically reset itself. Once the input torque $T_I$ drops to below the predetermined torque, the biasing force $F_B$ from the biasing member 84 will once again exceed the total axial force $F_A$ which the detent ring 74 can transmit through the ball members 80. Therefore, when continued rotation of the detent ring 74 by the input shaft 12 brings the detents 82 opposite the ball members 80, the biasing force $F_B$ will force the ball members 80 into the detents and maintain the ball members 80 firmly seated in the detents as long as the input torque $T_I$ is below the predetermined torque. As a result, the input shaft 12 will once again be rotationally coupled to the output shaft 16 and the torque input device 14 can resume normal operation. The ability of the ball detent mechanism 72 to automatically reset itself in this manner eliminates the need to stop the torque input device 14 to mechanically reengage the ball detent mechanism, or the need to reverse the direction or otherwise disrupt the operation of the torque input device 14.

Another advantage of the torque limiter 10 of the present disclosure is that the input and output shafts 12, 16 remain axially immobile during operation of the ball detent mechanism 72. The ball members 80 (and the thrust ring 86, if present) are the only members of the torque limiter 10 which are required to move axially during the transition of the ball detent mechanism 72 from the engaged condition to the disengaged condition and back again. No axial movement of the input and output shafts 12, 16 occurs. As a result, the interfaces between the input shaft 12 and the torque input device 14 and/or between the output shaft 16 and the torque-driven device 18 are not required to be specially configured to accommodate axial movement of the input and/or output shafts.

It should be understood that the ball members 80 and the detents 82 could have other configurations than those just described. For example, one or both of the first and second sides 88, 90 of the detents 82 may be convex or concave. Also, the ball members 80 may be configured as cylindrical rollers, in which event the detents 82 may be configured as elongated slots. As long as the relationship between the input torque $T_I$ and the total axial force $F_{AT}$ can be determined, the ball members 80 and the detents 82 can have any practical configuration.

In accordance with a further embodiment of the present disclosure, the torque limiter 10 may be provided with means for pressure compensating the ball detent mechanism 72 and/or the shaft seals 48, 70. Referring again to FIG. 1, for example, the housing 22 may include a pressure chamber 94 which is separated from the external environment by a flexible member 96, such as a bellows or flexible bladder. The pressure chamber 94 is connected to opposite sides of the ball detent mechanism 72 and/or the shaft seals 48, 70 by separate first and second channels 98, 100, and the torque limiter 10 is filled with a suitable pressure compensating fluid, such as the oil based lubricant discussed above, using, e.g., the injection fitting 54 discussed above.

In this manner, external pressure acting on the flexible member 96 will be transmitted via the pressure compensating fluid to the ball detent mechanism 72 and/or the shaft seals 48, 70, thereby creating a uniform drag on these components regardless of the depth at which the torque limiter 10 is used. As a result, the torque limiter may be deployed in hyper-deep water environments without unduly stressing the ball detent mechanism 72 and/or the shaft seals 48, 70. If desired, internal pressure exceeding a predetermined limit may be vented using appropriate means, such as the relief fitting 58 discussed above. In an optional embodiment, the torque limiter 10 may include a perforated cover 102 which is mounted to the housing 22 over the flexible member 96 to protect the flexible member from damage by external forces.

When designed for use with subsea valves, the torque limiter 10 may be configured to be mounted to a valve operator or fitted in an ROV bucket. Such adaptations of the torque limiter 10 are within the level of ordinary skill in the art. In the event the torque limiter 10 is configured to be fitted in an ROV bucket, the torque limiter may be provided with one or more body seals 104 (as shown in FIG. 1) to seal the housing 22 to the ROV bucket (not shown).

Configuring the ball ring 76 such that the ball members 80 are discrete ball-shaped elements which are movably received in the through holes 78 has several advantages. Especially in embodiments in which the ball ring 76 is formed integrally with the output shaft 16, providing separate ball members 80 makes manufacture of the output shaft relatively simple. Also, configuring the ball members 80 to be movably received in their corresponding through holes 78 allows the ball members to rotate within the through holes and roll along the sides 88 (or 90) of the detent 82 during the transition of the ball detent mechanism 72 from the engaged condition to the disengaged condition, thereby greatly reducing the frictional force between the ball members and the sides. As a result, the transition of the ball detent mechanism 72 from the engaged condition to the disengaged condition will occur much quicker when the predetermined torque is reached.

Figure 5:
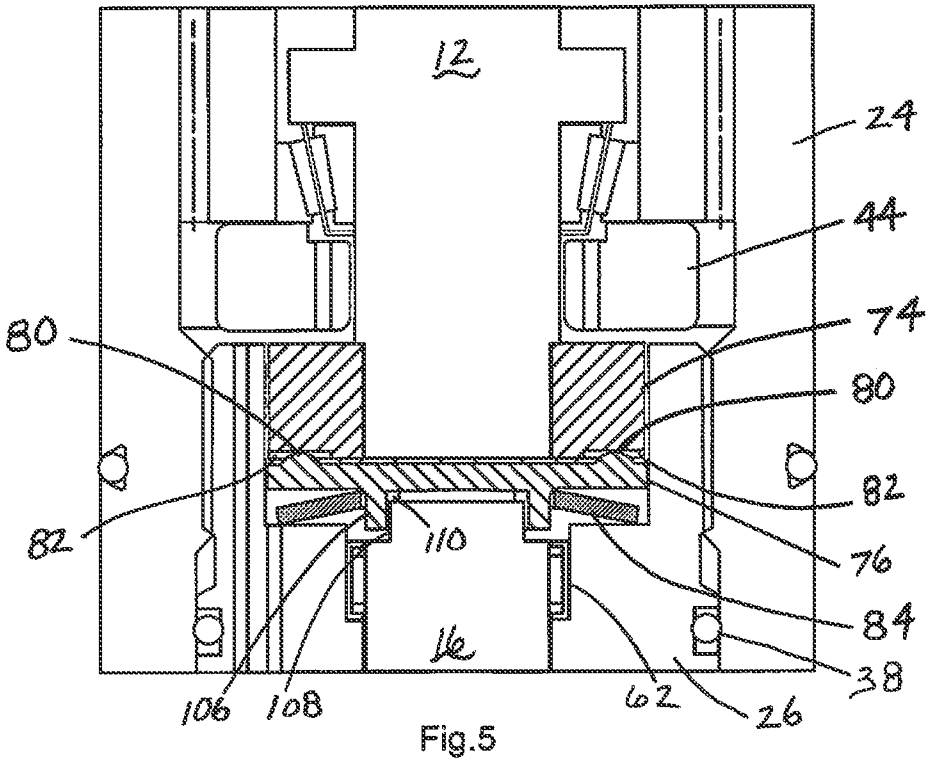
FIG. 5 is an alternative embodiment of the torque limiter of the present disclosure.

Notwithstanding the above, the present disclosure contemplates that the ball members 80 may be immovably connected to of formed integrally with the ball ring 76. Referring to FIG. 5, for example, in an alternative embodiment of the torque limiter of the present disclosure, the ball members 80 are connected to or formed integrally with the ball ring 76 and the ball ring is axially movably mounted on the output shaft 16. In this embodiment, the ball ring 76 may comprise a cylindrical collar 106 within which a reduced diameter end portion 108 of the output shaft 16 is slidably received. Also, a slot and key connection 110 or other suitable means may be employed between the collar 106 and the end portion 108 to prevent the ball ring 76 from rotating relative to the output shaft 16. In this particular example, the biasing member 84 is engaged directly between the ball ring 76 and the shoulder 85 of the output housing part 26, thereby eliminating the need for a separate thrust ring 86. All other aspects of the torque limiter of this embodiment may be as described above.

Figure 6:
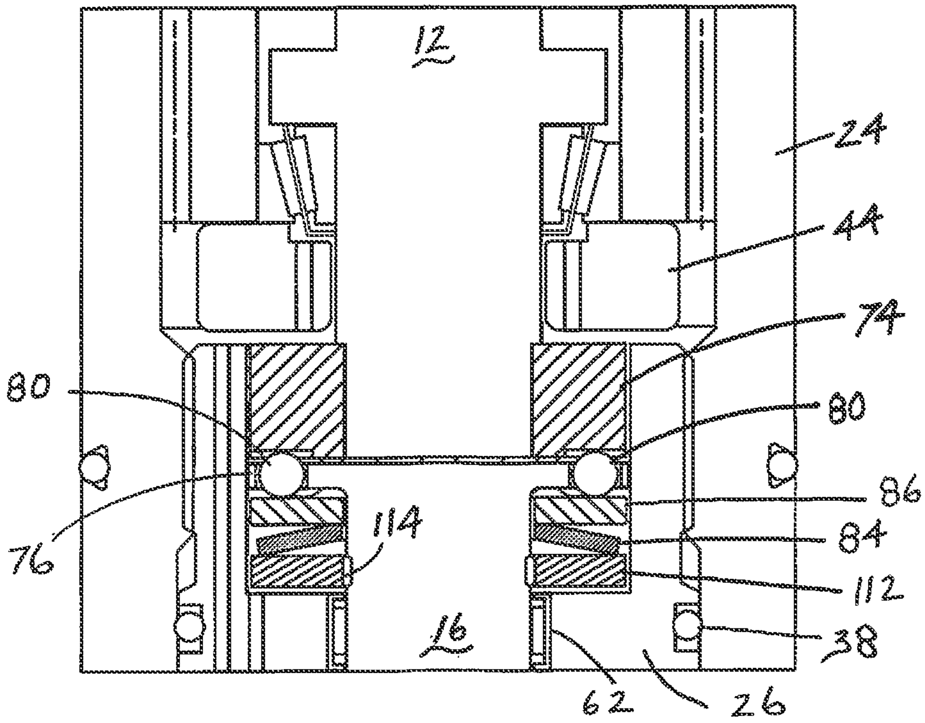
FIG. 6 is a further alternative embodiment of the torque limiter of the present disclosure.

In a further alternative embodiment of the torque limiter of the present disclosure, the biasing member 84 may be supported directly on the output shaft 16 rather than on the radial shoulder 85 of the output housing part 26. Referring to FIG. 6, for example, the biasing member 84 is supported on a seat ring 112 which is connected by threads 114 or other suitable means to the output shaft 16. In this embodiment, the output housing part 26 is not required to have a radial shoulder 85 in the vicinity of the ball ring 76. During assembly of the ball detent mechanism 72 of this embodiment, the thrust ring 86 (if used) is positioned on the output shaft 16, followed by the biasing member 84 and then the seat ring 112. All other aspects of the torque limiter of this embodiment may be as described above.

Figure 7:
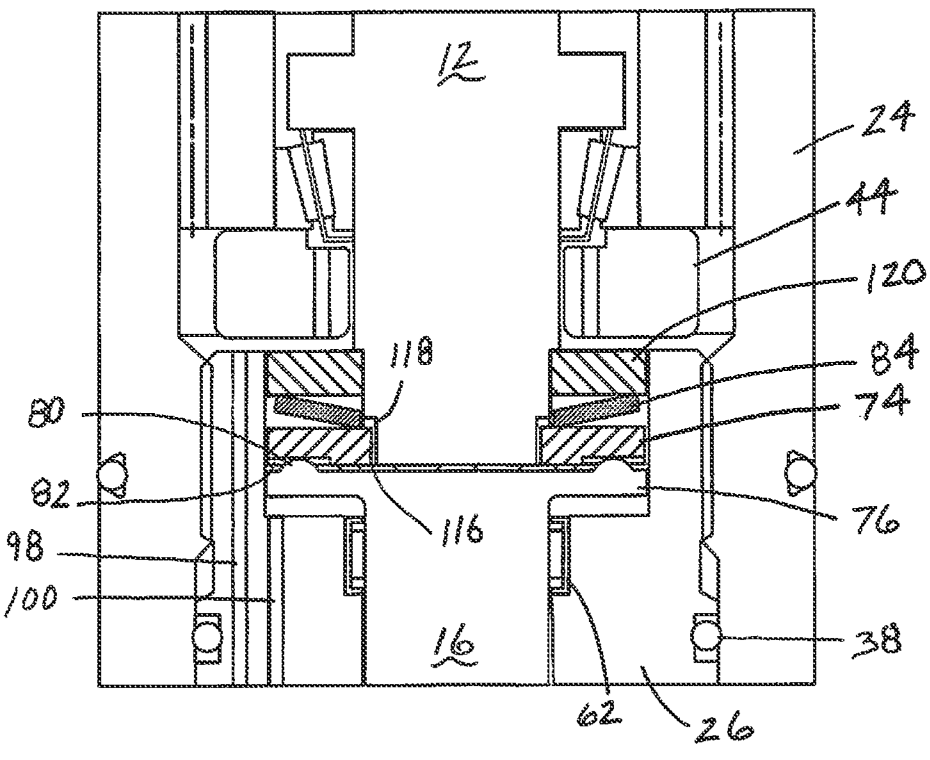
FIG. 7 is yet another alternative embodiment of the torque limiter of the present disclosure.

In the embodiments of the torque limiter illustrated in FIGS. 1-6. The ball detent mechanism 72 is designed such that the detent ring 74 is axially fixed in position and the ball members 80 (or the ball ring 76, as in the embodiment shown in FIG. 5) are biased into engagement with the detent ring. However, this need not be the case. Referring to FIG. 7, for example, an embodiment of the torque limiter is shown in which the ball ring 76 is axially fixed in position and the detent ring 74 is biased into engagement with the ball ring. In this embodiment, the detent ring 74 is axially movably mounted on a reduced diameter end portion 116 of the input shaft 12. A slot and key connection 118 or other suitable means may be employed between the detent ring 74 and the end portion 116 to prevent the detent ring from rotating relative to the input shaft 12. Also, the biasing member 84 is positioned between the detent ring 74 and a reaction ring 120 which is secured to the input shaft. In this example, the reaction ring 120 engages a radial shoulder 122 on the input shaft 12 to prevent axial movement of the reaction ring away from the ball ring 76. All other aspects of the torque limiter of this embodiment may be as described above.

It may be seen that these alternative embodiments offer some of the same advantages which were described previously. For example, the operation of the ball detent mechanisms of these alternative embodiments is bi-directional. Also, the ball detent mechanisms are capable of automatically re-setting themselves once the input torque $T_I$ on the input shaft drops below the predetermined torque. What is more, the input and output shafts of the alternative embodiments remain axially immobile during the transition of the ball detent mechanism between the engaged and disengaged conditions.

It should be recognized that, while the present disclosure has been presented with reference to certain embodiments, those skilled in the art may develop a wide variation of structural and operational details without departing from the principles of the disclosure. For example, the various elements shown in the different embodiments may be combined in a manner not described above. Therefore, the following claims are to be construed to cover all equivalents falling within the true scope and spirit of the disclosure.

What is claimed is:

1. A torque limiter which comprises:

a housing comprising an input housing part connected to an output housing part;

an input shaft rotatably supported in the input housing part;

an output shaft rotatably supported in the output housing part; and a ball detent mechanism which is operatively connected between the input shaft and the output shaft, the ball detent mechanism comprising:

a detent ring which is connected to one of the input shaft and the output shaft, the detent ring comprising a plurality of detents;

a ball ring which is connected to the other of the input shaft and the output shaft, the ball ring comprising a plurality of ball members which are each configured to be received in the detents;

wherein in an engaged condition of the ball detent mechanism, the ball members are maintained in position in the detents, thereby rotatably coupling the input shaft to the output shaft, and in a disengaged condition of the ball detent mechanism, the ball members are displaceable from the detents, thereby rotatably decoupling the input shaft from the output shaft;

a biasing member which is positioned in the housing on a side of the ball ring opposite the detent ring or on a side of the detent ring opposite the ball ring, the biasing member being designed to generate a force sufficient to maintain the ball detent mechanism in the engaged condition when a torque less than a predetermined torque is applied to the input shaft;

whereby when the torque applied to the input shaft reaches the predetermined torque, the ball detent mechanism will switch to the disengaged condition and rotatably decouple the input shaft from the output shaft;

wherein the input shaft and the output shaft are positioned coaxially end to end and the detent ring and the ball ring are connected between adjacent ends of the input and output shafts; and wherein the ball members are discrete components and the ball ring comprises a plurality of through holes within which the ball members are movably received.

2. The torque limiter of claim 1, wherein the biasing member is positioned on a side of the ball ring opposite the detent ring and is operatively engaged with the ball members so as to bias the ball members in a direction toward the detent ring.

3. The torque limiter of claim 2, further comprising a thrust ring which is positioned between the biasing member and the ball members.

4. The torque limiter of claim 2, wherein the biasing member is positioned between the ball members and an annular shoulder formed in the output housing part.

5. The torque limiter of claim 2, wherein the biasing member is positioned between the ball members and a seat ring which is connected to said other of the input shaft and the output shaft.

6. The torque limiter of claim 1, wherein the detent ring is axially movably but rotationally immovably connected to said one of the input shaft and the output shaft, the biasing member is positioned on a side of the detent ring opposite the ball ring, and the biasing member is operatively engaged with the detent ring so as to bias the detent ring toward the ball members.

7. The torque limiter of claim 6, wherein the biasing member is positioned between the detent ring and a reaction ring which is connected to said one of the input shaft and the output shaft.

8. The torque limiter of claim 1, further comprising means for pressure compensating the ball detent mechanism.

9. The torque limiter of claim 8, wherein the pressure compensating means comprises:

a pressure chamber which is formed in the housing and is separated from an environment external to the torque limiter by a flexible member;

a first channel which extends between the pressure chamber and a first side of the ball detent mechanism; and a second channel which extends between the pressure chamber and a second side of the ball detent mechanism.

10. The torque limiter of claim 1, wherein the input housing part comprises an axial receptacle, wherein the input shaft is rotationally supported in a bearing arrangement positioned in the receptacle, and wherein the bearing arrangement is retained in the receptacle by a retainer ring to thereby secure the input shaft to the input housing part.

11. The torque limiter of claim 10, wherein the output housing part comprises an axially extending sleeve portion which is received in the receptacle, and wherein at least one of the ball ring and the detent ring is positioned within the sleeve portion.

12. The torque limiter of claim 11, further comprising means for pressure compensating the ball detent mechanism.

13. The torque limiter of claim 12, wherein the pressure compensating means comprises:

a pressure chamber which is formed in the output housing part and is separated from an environment external to the housing by a flexible member;

a first channel which extends through the output housing part between the pressure chamber and a first side of the ball detent mechanism; and a second channel which extends through the output housing part between the pressure chamber and a second side of the ball detent mechanism.

14. The torque limiter of claim 13, wherein the first channel extends axially through a distal end of the sleeve portion.

15. A torque limiter which comprises:

a housing comprising an input housing part connected to an output housing part;

an input shaft rotatably supported in the input housing part;

an output shaft rotatably supported in the output housing part; and a ball detent mechanism which is operatively connected between the input shaft and the output shaft, the ball detent mechanism comprising:

a detent ring which is connected to one of the input shaft and the output shaft, the detent ring comprising a plurality of detents;

a ball ring which is connected to the other of the input shaft and the output shaft, the ball ring comprising a plurality of ball members which are each configured to be received in the detents;

wherein in an engaged condition of the ball detent mechanism, the ball members are maintained in position in the detents, thereby rotatably coupling the input shaft to the output shaft, and in a disengaged condition of the ball detent mechanism, the ball members are displaceable from the detents, thereby rotatably decoupling the input shaft from the output shaft;

a biasing member which is positioned in the housing on a side of the ball ring opposite the detent ring or on a side of the detent ring opposite the ball ring, the biasing member being designed to generate a force sufficient to maintain the ball detent mechanism in the engaged condition when a torque less than a predetermined torque is applied to the input shaft;

whereby when the torque applied to the input shaft reaches the predetermined torque, the ball detent mechanism will switch to the disengaged condition and rotatably decouple the input shaft from the output shaft;

wherein the input shaft and the output shaft are positioned coaxially end to end and the detent ring and the ball ring are connected between adjacent ends of the input and output shafts; and wherein the ball members are fixedly connected to or formed integrally with the ball ring.

16. The torque limiter of claim 15, wherein the ball ring is axially movably but rotationally immovably connected to said other of the input shaft and the output shaft, the biasing member is positioned on a side of the ball ring opposite the detent ring, and the biasing member is operatively engaged with the ball ring so as to bias the ball ring toward the detent ring.

17. The torque limiter of claim 15, wherein the detent ring is axially movably but rotationally immovably connected to said one of the input shaft and the output shaft, the biasing member is positioned on a side of the detent ring opposite the ball ring, and the biasing member is operatively engaged with the detent ring so as to bias the detent ring toward the ball members.

18. The torque limiter of claim 17, wherein the biasing member is positioned between the detent ring and a reaction ring which is connected to said one of the input shaft and the output shaft.

19. A torque limiter which comprises:

a housing;

an input shaft which is rotatably supported in the housing;

an output shaft which is rotatably supported in the housing coaxially with the input shaft; and a ball detent mechanism which is connected between adjacent ends of the input and output shafts, the ball detent mechanism comprising:

a ball ring which is connected to the output shaft, the ball ring comprising a plurality of axial through holes and a corresponding number of ball members which are movably received in the through holes;

a detent ring which is connected to the input shaft, the detent ring comprising a plurality of detents which are configured to receive the ball members; and a biasing member which is positioned on a side of the ball ring opposite the detent ring, the biasing member being operatively engaged with the ball members so as to bias the ball members in a direction toward the detent ring and being designed to generate a force sufficient to maintain the ball members seated in the detents when a torque less than a predetermined torque is applied to the input shaft;

wherein in an engaged condition of the ball detent mechanism, the ball members are maintained in position in the detents, thereby rotatably coupling the input shaft to the output shaft, and in a disengaged condition of the ball detent mechanism, the ball members are displaceable from the detents, thereby rotatably decoupling the input shaft from the output shaft;

whereby when the torque applied to the input shaft reaches the predetermine torque, the ball detent mechanism will switch to the disengaged condition and rotatably decouple the input shaft from the output shaft.

20. The torque limiter of claim 19, wherein the biasing member is positioned between the ball members and an annular shoulder formed in the housing.

21. The torque limiter of claim 20, further comprising a thrust ring which is positioned between the biasing member and the ball members.

22. The torque limiter of claim 19, further comprising means for pressure compensating the ball detent mechanism.

23. The torque limiter of claim 22, wherein the pressure compensating means comprises:

a pressure chamber which is formed in the housing and is separated from an environment external to the torque limiter by a flexible member;

a first channel which extends through the housing between the pressure chamber and a first side of the ball detent mechanism; and a second channel which extends through the housing between the pressure chamber and a second side of the ball detent mechanism.

24. The torque limiter of claim 19, wherein the housing is configured to be mounted to a valve operator or fitted in an ROV bucket.

* * * * *